April 7, 1964

M. DARMON ETAL 3,128,367

APPARATUS FOR THE ELECTRIC WELDING OF HOLLOW
BODIES, SUCH, MORE PARTICULARLY, AS
VENTILATION CASING

Filed April 10, 1961

April 7, 1964    M. DARMON ETAL    3,128,367
APPARATUS FOR THE ELECTRIC WELDING OF HOLLOW
BODIES, SUCH, MORE PARTICULARLY, AS
VENTILATION CASING
Filed April 10, 1961    5 Sheets-Sheet 3
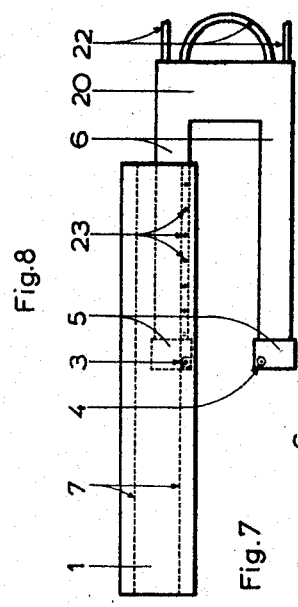
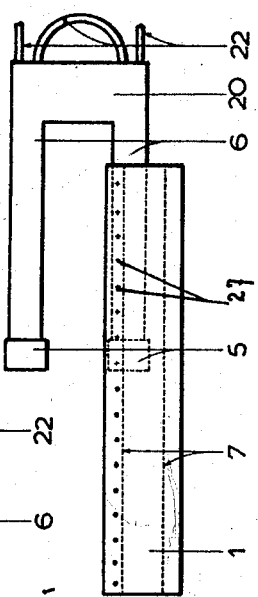
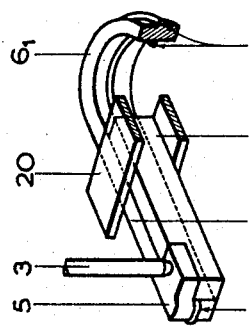
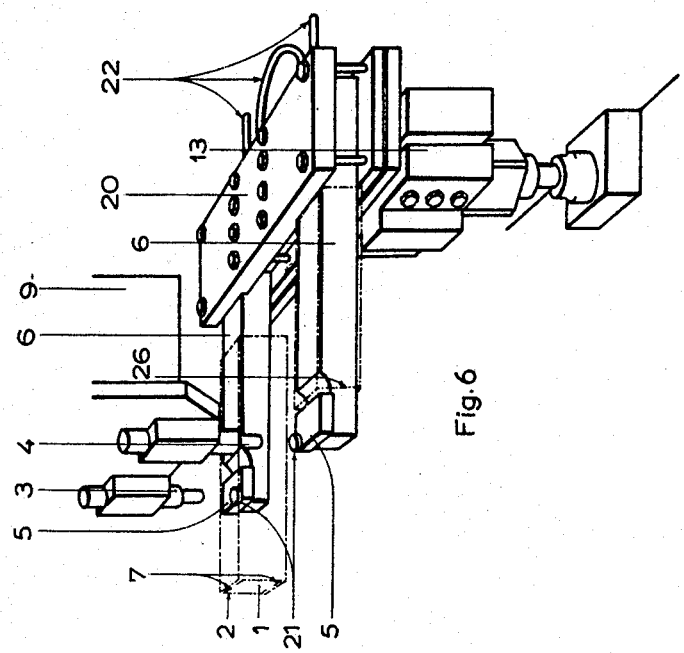

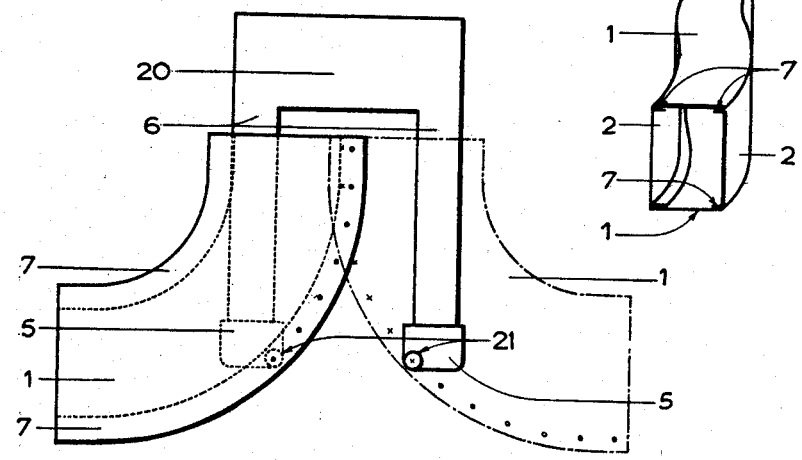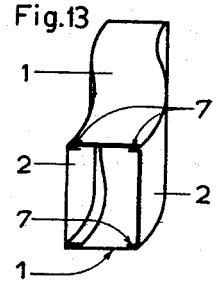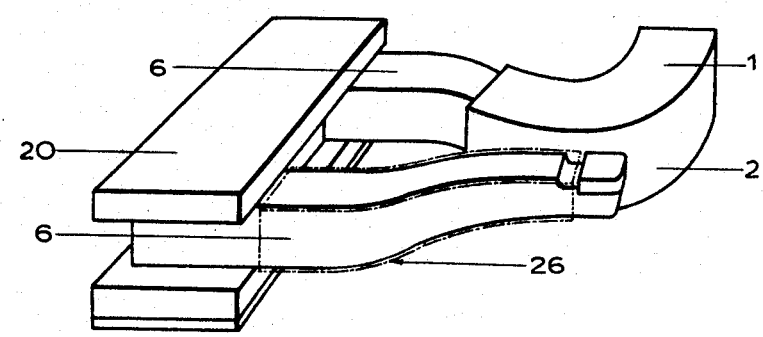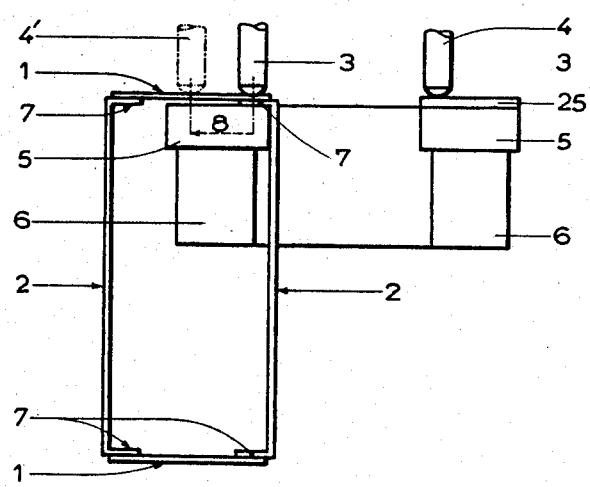

United States Patent Office 3,128,367
Patented Apr. 7, 1964

3,128,367
APPARATUS FOR THE ELECTRIC WELDING OF HOLLOW BODIES, SUCH, MORE PARTICULARLY, AS VENTILATION CASING
Michel Darmon, 1 Square Commandant l'Herminier, and Marcel Le Bihan, 3 Rue Emile Combe, both of Brest, Finistere, France
Filed Apr. 10, 1961, Ser. No. 101,957
Claims priority, application France Apr. 12, 1960
3 Claims. (Cl. 219—78)

The invention relates to apparatus for the electric welding of hollow parts of light metal.

It has the purpose of providing apparatus that welds hollow parts more effectively and with a more perfect finish, and hence a better external appearance than previously accomplished in the art.

The invention will be easily understood from the description which follows, and the attached drawings, in which;

FIGURE 1 shows in perspective a welding machine for manufacturing ventilation casings, according to the invention, FIGURE 2 shows an enlarged cross sectional view of a portion of the matter illustrated in FIG. 1, FIGURE 3 shows a double-curved ventilation casing, FIGURE 4 shows a similar casing with an articulated arm forming a support for the welding ground, FIGURE 5 shows in section another arrangement of the welding electrodes with respect to the casing.

FIGURE 6 shows in perspective, a machine according to the invention for welding sheet steel into casings.

FIGURE 7 shows partially in perspective and with parts cut away another arrangement of the matter illustrated in FIG. 6, FIGURES 8 and 9 are plane views in different working stages of portions of the matter illustrated in FIG. 6, FIGURE 10 shows a front view of the same portion illustrated in FIGS. 8 and 9, on a larger scale;

Figure 14:
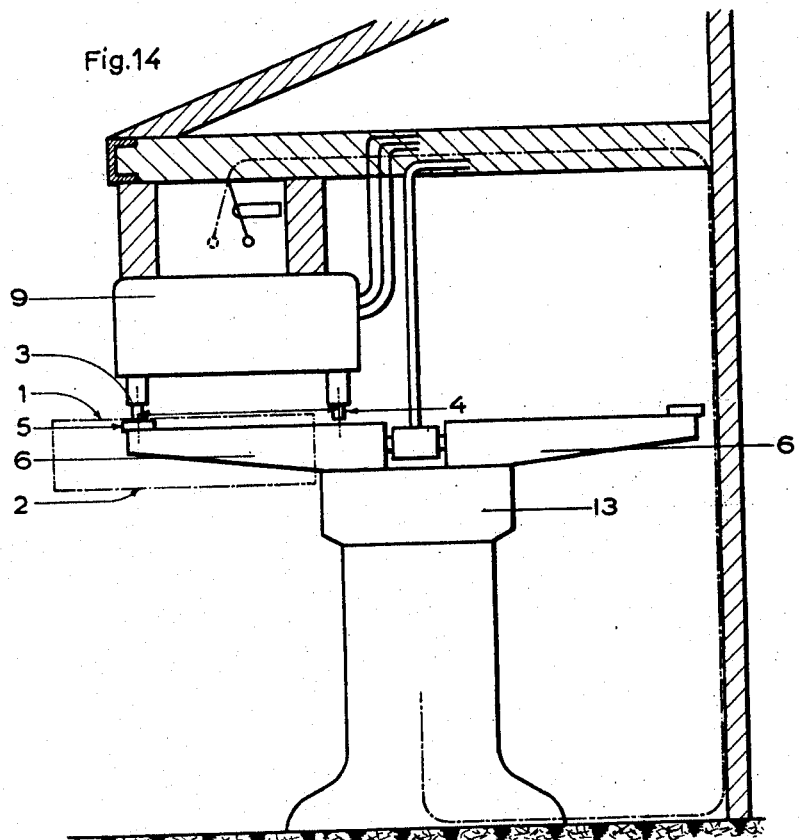
Figure 15:
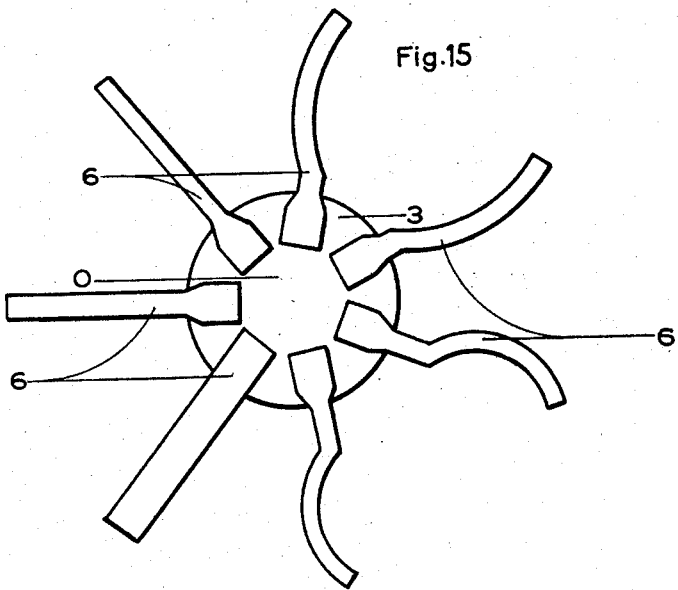

FIGURE 11 is a view similar to FIGURE 7, in another arrangement for use with curved casings, FIGURE 12 shows, in perspective a further arrangement for use with curved casings, FIGURE 13 shows, in perspective, elements of a wave shaped casing that are welded by the invention, FIGURE 14 shows in elevation, with parts cut away, another embodiment of the invention, and FIGURE 15 is a plane view of, some of the elements illustrated in FIG. 14.

The invention provides improved apparatus to make ventilation casings, by electrically welding together steel sheets previously cut out and shaped.

The most general technique for electrically welding two overlapping sheets comprises placing two electrodes respectively on the respective outer surfaces of the juxtaposed sheets or edges to be assembled. In the case of hollow bodies of straight aspect and appreciable dimensions, it is possible, without too much difficulty, to introduce into the hollow casing the interior electrode for application on the interior outer surface. But this is not the case when the hollow body or casing is small or has a curved shape, which is frequent.

To make the welding operation possible in all cases, according to the invention, the welding is effected by what is called the "indirect" process, i.e., with two electrodes placed outside, in which case it suffices to put a welding ground inside that takes up the pressure of the electrodes and which is an arm, either rigid, distortable and/or extensible, for engagement longitudinally in the assembled casing.

Figure 1:
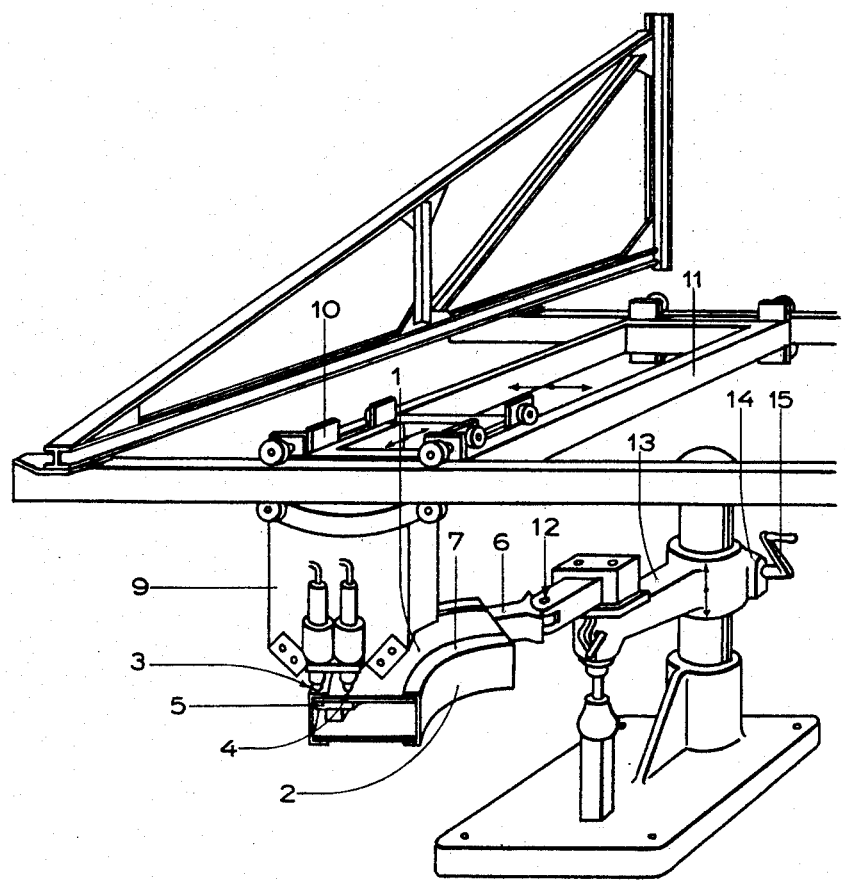
Figure 2:
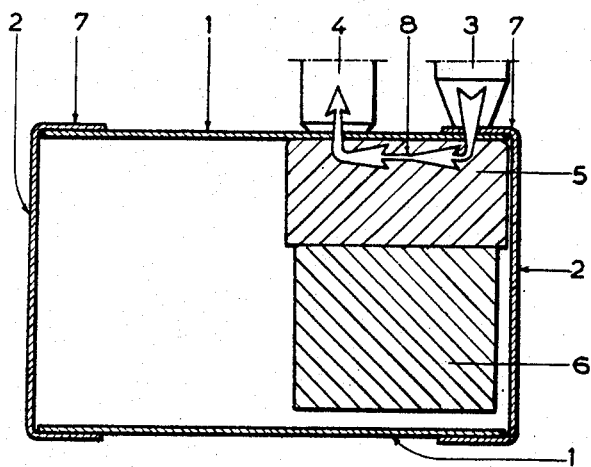

FIGURES 1 and 2 show sheets 1 defining the outer flat faces of the casing, curved sides 2 of the casing 1 the principal electrodes 3 and 4, and the welding ground 5 made, for example, of copper and mounted on a support arm 6.

In the case, for example, of parts to be assembled by welding the flanged edges 7 of sides 2 to the sheets 1, the welding current takes the pathway shown by the arrows 8, FIGURE 2.

It is preferable to proceed in such manner that the pressure of the electrodes is applied vertically, which enables this pressure to be more easily balanced.

It is then preferable to position the casings so that the welding work takes place in the horizontal plane of the sheets 1, in which case the flanged edges 7 are comprised by the curved sides 2, said flanged edges covering the outside of the faces 1.

Figure 5:
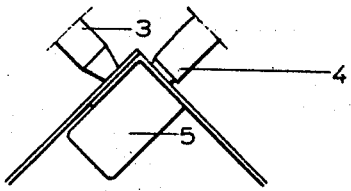

This procedure is not, however, exclusive: as shown diagrammatically in FIGURE 5, the two external electrodes may be placed at 90° to each other.

With regard to the equipment for effecting welding operations, including the means for making sure that the electrodes and parts to be welded are in the correct relative positions, resource may be had to the various embodiments shown in the drawings.

Firstly, with regard to the welding machine 9, it is mounted so that its electrodes can be moved horizontally in two orthogonal directions and being held for this purpose by a carriage 10, which can move on a platform of an overhead crane 11. Moreover, the machine 9 is pivotal around a vertical spindle, so as to enable the electrodes to be oriented.

With regard to the arm supporting the welding ground, it is preferably mounted to pivot around a vertical axle such as 12, with means for locking it (not shown).

The assembly of this arm is carried by a support 13 advantageously adjustable for height by means of a mechanism 14 manually operable by crank 15.

Thus, parts can be brought for welding to any height required.

Figure 3:
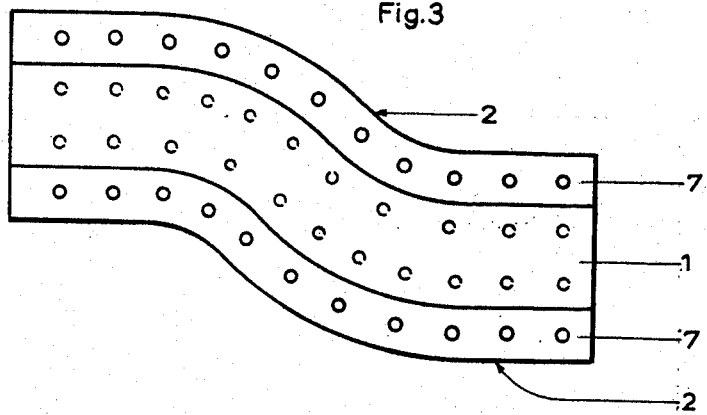
Figure 4:
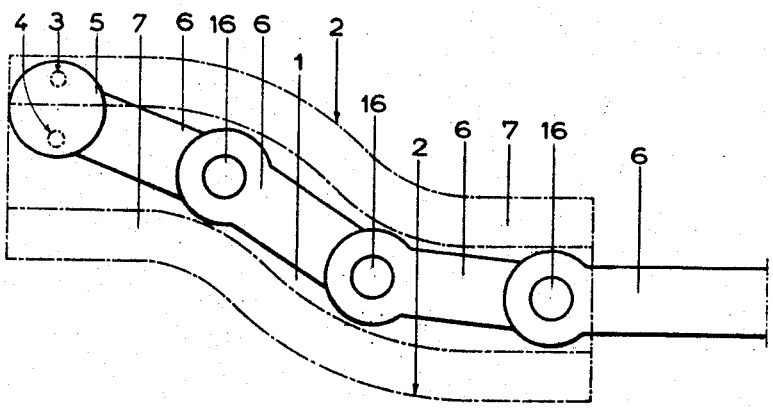

FIGURES 3 and 4 relate to a case of a biconvex profile part of a casing, in which an arm 6 is formed of several links connected by pivots 16.

In all cases, this arm 6 is mounted so as to be able easily to bear vertical stresses resulting from the pressures of the electrodes 3 and 4.

It is moreover understood that the arrangement of the arm to overhang, shown in the drawings, is by no means restrictive.

The casing to be welded is mounted so as to be supported by a table, and extensible chucks (screwed, for example) simply held by a light arm, extending between the casing and the table to enable the pressure of the electrodes to be transmitted to the table.

Lastly, the manner of arranging the sheets 1 and sides 2 of the casings, may be the arrangements of FIGS. 2 and 5.

The sheets 1 are cut to shape. The curved sides 2, with their flanged edges 7, are first cut to shape and then bent to form the flanged edges 7. The bending will have the effect of subjecting the edges to stresses, either of extension, or reduction, according to the direction of the curvature.

For this bending, use may be advantageously made of the process described in a patent application filed concurrently with this one.

Thus ventilation casings or any other hollow bodies can be made in conditions which reveal numerous advantages as compared with already existing apparatus and processes of this kind, more particularly:

Greater simplicity of execution,
Greater accuracy in the work.

According to another characteristic, the invention proposes to make—by welding hollow bodies such as ventilation casings—casings formed, for example, by flange edges 7 of sides 2, capable of being connected by other sheets 1 (the sides 2 can be rectilinear or curvilinear).

It has been previously proposed to engage the hollow body or casing, with a view to the welding operation, on an arm 6 with a welding ground 5, and to make the weld by means of two electrodes of which the electrode 3 (FIGURE 2) is a working electrode placed facing the flanged edges 7 on which the weld is to be made, whereas the other electrode 4 is similar and placed on sheets 1 adjacent the flanged edges 7 for completing the welding circuit.

In this form of the invention, the current which, for example, input by the electrode 3 and output by the electrode 4, should, for ensuring a proper weld, traverses the welding ground 5, generally made of copper, in the direction of the arrow 8, but this resulted in certain disadvantages, especially in the case of light alloys.

In the first place, unless special precautions are taken it is not always possible to place the flange edges 7 inside the hollow body. Actually, in this case, and if it refers to light alloys, taking into account the low resistance of such alloy, the current would practically all pass into the sheet 1, and there would be no weld. We are thus led, with this embodiment, to place the flanged edges 7 outside as shown in FIG. 2.

Moreover, the presence of the electrode 4 on the plate 1 leads to the formation of impressions at that spot owing to the passage of the current.

Finally, the external appearance of casings obtained by the preceding process is less pleasing, owing, on the one hand, to the presence of the flanged edges 7 on the outside of the casing, and on the other, to the presence of the current formed impressions on the sheets 1.

To obviate these disadvantages according to FIGS. 6, 10 and 14, that the hollow bodies for welding are engaged on arms 6, as is already known, but that the auxiliary electrode, instead of being brought into contact with the sheet 1 adjacent to the working electrode, is put into contact with the arm 6 itself and at a proper distance from the working electrode 3.

Concurrently it is also arranged that the arm 6 has a very great conductibility, so that the current passes therethrough as the path of least resistance from the working electrode 3, through both parts of the sheet to be welded to the arm 6 or to the welding ground 5 carried by the latter.

By such an arrangement, there is the possibility, on the one hand, of placing the flanges 7 underneath the plate 1 as shown in FIGURE 10, and on the other, of avoiding the formation of impressions on the sheets 1 owing to the auxiliary electrode.

There are various ways to put the aforementioned arrangement into operation, for example:

By employing a double arm 6, i.e., an arm substantially of U-shape, which enables, as will be explained farther on, to carry out successively part of the welds on one of the arms, then part of the welds on the other arm, in combination with two electrodes 3, 4 (FIGURES 6 to 9) cooperating with the free ends of the two arms 6 and alternately used as a working electrode and an auxiliary electrode;

By employing a single arm 6 in combination with two electrodes 3 and 4 sufficiently far apart from each other that, carrying out the welding job by means of the working electrode, the other electrode can come into contact only with the arm 6, outside the sheets, this solution being shown in FIGURES 14 and 15;

Or in any other similar manner.

According to the first way given above, we employ, for example, two highly conductive arms 6, connected by a crossbar also highly conductive 20, which crossbar can form part with the two U-shaped arms (FIGURES 8 and 9) or be made (FIGURE 6) with perfectly faced surfaces for obtaining a good contact, taking into account the very considerable amount of current used for such welds. Said arms carry, at their free end, welding grounds 5, comprising contact studs 21. The two electrodes 3, 4 can be carried by a welding machine 9 that is possibly moveable (FIGURE 14) for example, carried by a carriage, and the arm assembly 6 can be carried by a frame 13, that is movable vertically.

The arms 6 will preferably be cooled, for example, by a liquid circulation 22 which can be either inside of or outside of the arms.

FIGURES 8 and 9 show how a welding operation can be carried out along one of the flanged edges 7.

Firstly, one of the ends of the casing or hollow body is engaged on one of the arms 6 (FIGURE 8) and several welding points 23 for spot welding are established on half of said casing while bringing the electrodes closer then moving them away, according to usual methods. Of course, spot welding can be replaced by continuous milling tool welding.

Then, the casing is removed, turned over, and the same operation proceeded with, but on the other arm 6 for making spot welds or the like, such as 24 (FIGURE 9).

It will be seen that in the first operation, it is the electrode 3 which is the working electrode, whereas the electrode 4 is an auxiliary electrode; in the second operation, the roles are reversed.

On arms 6 of this kind, it is easy to weld parts of very different shapes, for example, curved, as shown in FIGURE 11.

Moreover, there is nothing to prevent the imparting, if necessary, to these arms 6 any curved or other suitable shape, as shown in FIGURE 12.

FIGURE 13 shows in perspective, a casing whose mean line is sinusoidal.

With regard to the way of making the arms 6 with a view to giving them low resistance which is necessary, recourse may be had to all suitable alloys, more particularly cupreous alloys.

It appears that a resistivity at 20°, of the order of 4 microhms per cm.$^2$ is suitable.

Furthermore, the mechanical strength must be somewhat high, the mechanical characteristics being, for example, as follows:

Tensile strength ranging about 70 kg. per mm.$^2$;
Elastic limit ranging about 55 kg. per mm.$^2$
Elongation ranging about 10%;
Modulus of elasticity ranging about 12,000.

The alloy sold in the trade under the name of "C.R.–80", appears to be suitable, this alloy comprising, for example:

Beryllium _____percent__ 0.5 to 0.7
Cobalt _____percent__ 2.2 to 2.5
Copper _____ the remainder It should also be noted, as can be seen in FIGURE 10, that underneath the auxiliary electrode a wedge 25 is provided to compensate for the thickness of the sheets under the working electrode 3.

It has been ascertained that once the position of the two electrodes on a given double arm has been adjusted, there is no further adjusting operation required. During mounting, the work planes remain continually horizontal, so that it is easy to use, as support, a horizontal work assembly, adjustable for height, according to the height of the casings required to be welded.

It should also be noted that to obtain arms having at the same time great mechanical strength and very low electric resistance, it is also possible to give them a mixed steel-copper structure. The steel which alone takes up the pressure of the electrodes is a steel with a high mechanical characteristic (breaking stress 110 kg./mm.$^2$), for example, steel of the AFNOR 35–NC–15 type—the copper which alone ensures the passage of the current without taking part in the mechanical resistance of the arm is pure copper, and thus very conductive. Such an arm with a mixed steel-copper structure is shown in FIGURE 7, where we see at 6 one of the two steel arms, and against these arms, an advantageously continuous lining $6_1$ of pure copper, its front portions forming a welding ground at 5. Cooling is shown in 22.

We will now suppose that the embodiment stated above is used according to which recourse is had, for each welding operation or operation phase, to a single arm 6, the electrodes 3 and 4 being supported by a welding machine 9 so arranged as to present said electrodes at two distinct points, and separated by a sufficient distance $d$, from said arm.

In particular, as shown in FIGURES 15 and 14, recourse may be had to various arms 6, placed radially around an axle 0, these various arms enabling welds to be made on casings or other objects of different shapes, by rotating a table 13 holding said arms. It is possible to pass from welding a casing to the welding of another casing, in front of the same electrodes 3 and 4, thus considerably simplifying the work.

It should be noted that in all cases, one part of the arms can be covered by a hood 26 of insulating plastic material (FIGURES 6 and 12) to protect the operator.

Therefore, whatever the embodiment adopted, we can ensure the welding of hollow or any other parts in a much quicker manner and with a better working finish than has been obtained up till now.

The ventilation casings are, of course, only given by way of example, and other parts could be treated in a similar manner, for example, elements used for making metal furniture (wardrobes, lockers, etc. . . .).

It goes without saying, and moreover as resulting already from the foregoing, that the invention is by no means restricted to those of these methods of application, nor to the forms of embodiment of its various parts, which have been more especially considered: on the contrary, it embraces all the alternatives.

What I claim is:

1. In a machine for welding hollow bodies, a U-shaped structure having two arms which are electrically interconnected and substantially symmetrical with one another, a counter electrode on the extremity of each of said arms, two welding electrodes which are electrically connected to a current source and disposed above and toward a lateral edge of each counter electrode, a hollow body to be welded being positioned on one or the other of said arms, and means for moving said arms and electrodes simultaneously toward one another to bring one welding electrode into contact with said body on one arm and the other electrode into contact with the counter electrode on the other arm whereby a weld is effected by said one welding electrode and the other welding electrode and corresponding counter electrode provide a return path for the current.

2. In a machine for welding hollow bodies, a U-shaped structure having two horizontally-spaced arms which are electrically interconnected with one another, a counter electrode on the extremity of each of said arms, a welding electrode disposed above and over a lateral edge portion of each of said counter electrodes, said counter electrodes and welding electrodes being substantially symmetrical with respect to a vertical plane between the two arms, said welding electrodes being connected to a source of electric current and means for moving said arms and welding electrodes toward one another to weld a hollow body positioned on either of said arms.

3. In a machine for welding hollow bodies, a unitary U-shaped structure having two horizontally-spaced arms, said arms being curved and substantially symmetrical with respect to one another, a counter electrode on the extremity of each of said arms, a welding electrode disposed above and over a lateral edge portion of each of said counter electrodes, said counter electrodes and welding electrodes being substantially symmetrical with respect to a vertical plane between said two arms, said welding electrodes being connected to an electric current source and means for moving said arms and welding electrodes toward one another to weld a curved hollow body positioned on either of said arms.

References Cited in the file of this patent

UNITED STATES PATENTS

| | | |
|---|---|---|
| 1,703,588 | Meadowcraft | Feb. 26, 1926 |
| 1,724,381 | Von Henke | Aug. 13, 1929 |
| 1,995,368 | Sunnen | Mar. 26, 1935 |
| 2,040,349 | Wagner | May 12, 1936 |
| 2,234,232 | Chambers | Mar. 11, 1941 |
| 2,263,038 | Heim | Nov. 18, 1941 |
| 2,264,825 | Bloomer et al. | Dec. 2, 1941 |
| 2,300,700 | Porter et al. | Nov. 3, 1942 |
| 2,314,882 | Hensel et al. | Mar. 30, 1943 |
| 2,343,998 | Powell | Mar. 14, 1944 |
| 2,345,630 | Ringwald | Apr. 4, 1944 |
| 2,479,053 | Adams | Aug. 16, 1949 |

FOREIGN PATENTS

| | | |
|---|---|---|
| 380,397 | Great Britain | Sept. 15, 1932 |
| 886,170 | France | June 28, 1943 |